(12) United States Patent
Kagawa et al.

(10) Patent No.: US 11,182,883 B2
(45) Date of Patent: Nov. 23, 2021

(54) IMAGE PROCESSING APPARATUS, IMAGE PROCESSING METHOD, AND NON-TRANSITORY COMPUTER-READABLE STORAGE MEDIUM THAT OUTPUT A SECOND IMAGE OF WHICH BRIGHTNESS VALUES OF PIXELS ARE OUTPUT BRIGHTNESS VALUES BASED ON RELATIONSHIP INFORMATION AND AN INPUT BRIGHTNESS VALUE OF A FIRST IMAGE

(71) Applicant: CANON KABUSHIKI KAISHA, Tokyo (JP)

(72) Inventors: Hidetsugu Kagawa, Kawasaki (JP); Tetsuya Suwa, Yokohama (JP); Maya Yazawa, Kawasaki (JP); Shuhei Ogawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 99 days.

(21) Appl. No.: 16/459,090

(22) Filed: Jul. 1, 2019

(65) Prior Publication Data
US 2020/0013150 A1 Jan. 9, 2020

(30) Foreign Application Priority Data
Jul. 6, 2018 (JP) .............................. JP2018-129467

(51) Int. Cl.
*G06T 5/40* (2006.01)
*G06T 5/00* (2006.01)
(Continued)

(52) U.S. Cl.
CPC .......... *G06T 5/009* (2013.01); *G06K 15/1825* (2013.01); *G06K 15/1878* (2013.01);
(Continued)

(58) Field of Classification Search
CPC .......... G06T 5/007–5/009; G06T 2207/20208; G06T 2207/20021; H04N 5/2355; H04N 5/355–5/3559; G06K 15/1825
See application file for complete search history.

(56) References Cited

U.S. PATENT DOCUMENTS

| 7,742,637 | B2 * | 6/2010 | Xiao | H04N 1/4074 |
| | | | | 382/167 |
| 2015/0181186 | A1 * | 6/2015 | Lim | G06T 5/008 |
| | | | | 348/712 |
| 2019/0342603 | A1 * | 11/2019 | Hirota | G11B 27/00 |

FOREIGN PATENT DOCUMENTS

JP 2006-129105 A 5/2006

* cited by examiner

*Primary Examiner* — Brian Werner
(74) *Attorney, Agent, or Firm* — Venable LLP (57) ABSTRACT

An image processing apparatus sets, for at least one portion of a first image in which a brightness range is a first range, relationship information which associates an input brightness value with an output brightness value, changes, based on the relationship information, brightness values of pixels in the portion, and outputs a second image which has a second range of brightness. The relationship information is generated so as to associate, with each of the brightness values of the pixels in the portion, an output brightness value which does not exceed a value higher than the brightness value by a predetermined value, and to associate, with a brightness value which is not less than a feature amount among the brightness values of the pixels in the portion, a predetermined output brightness value falling within a predetermined range.

25 Claims, 9 Drawing Sheets

(51) Int. Cl.
*G06K 15/02* (2006.01)
*H04N 1/60* (2006.01)
(52) U.S. Cl.
CPC ............ *H04N 1/6027* (2013.01); *G06T 5/40* (2013.01); *G06T 2207/20021* (2013.01); *G06T 2207/20208* (2013.01)

IMAGE PROCESSING APPARATUS, IMAGE PROCESSING METHOD, AND NON-TRANSITORY COMPUTER-READABLE STORAGE MEDIUM THAT OUTPUT A SECOND IMAGE OF WHICH BRIGHTNESS VALUES OF PIXELS ARE OUTPUT BRIGHTNESS VALUES BASED ON RELATIONSHIP INFORMATION AND AN INPUT BRIGHTNESS VALUE OF A FIRST IMAGE

BACKGROUND OF THE INVENTION

Field of the Invention

The present invention relates to a dynamic range compression technique for image brightness.

Description of the Related Art

In recent years, HDR (high dynamic range) content having a reproduction range of high brightness and wide color gamut has become popular. In HDR content, high-quality image expression using a wide brightness range by a highest brightness of 1,000 nit or more is performed. On the other hand, when printing HDR image data by an inkjet printing apparatus, the dynamic range (to be referred to as a "D range" hereinafter) of the brightness needs to be compressed, by using a tone curve or the like, into the D range of a brightness that the printing apparatus can reproduce. To reduce lowering of contrast in the D range compression, a method of locally performing D range compression is used. Japanese Patent Laid-Open No. 2006-129105 describes a technique of dividing an input image into a plurality of areas, deciding a lookup table for each of the divided areas, and performing D range compression.

In the D range compression disclosed in Japanese Patent Laid-Open No. 2006-129105, the relationship between the brightness values of an input image and the brightness values of an output image is set in accordance with a brightness value distribution for each region in the input image, and brightness value conversion is performed based on this setting. However, the technique disclosed in Japanese Patent Laid-Open No. 2006-129105 poses a problem in that contrast degradation may occur when the range of the input brightness value distribution is large and that an output brightness value may become extremely high depending on the input brightness value distribution.

SUMMARY OF THE INVENTION

The present invention provides a technique for appropriately executing dynamic range conversion between an input image and an output image.

According to one aspect of the present invention, there is provided an image processing apparatus, comprising: at least one processor; and at least one memory coupled to the at least one processor, wherein the at least one memory stores an instruction that causes, when executed by the at least one processor, the image processing apparatus to: set, for at least one portion of a first image in which a brightness range is a first range, relationship information which associates an input brightness value with an output brightness value; change, based on the relationship information, brightness values of pixels included in the at least one portion of the obtained first image; and output a second image which has a second range of brightness narrower than the first range and in which the brightness values of the pixels are changed, wherein the instruction causes the image processing apparatus to: in the setting, specify a feature amount related to the brightness values included in the at least one portion of the first image, and generate the relationship information so as to associate, with each of the brightness values of the pixels included in the at least one portion of the first image, an output brightness value which does not exceed a value that is higher than the brightness value by a predetermined value, and to associate, with a brightness value which is not less than the feature amount among the brightness values of the pixels included in the at least one portion of the first image, a predetermined output brightness value which is a value that falls within a predetermined range of the second range in descending order.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

(Dynamic Range Compression)

A dynamic range (to be referred to as "D range" hereinafter) compression method of Japanese Patent Laid-Open No. 2006-129105 of compressing a dynamic range, which is image processing for obtaining, from an input image having a first brightness range, an output image having a second brightness range narrower than the first brightness range, will be described. This D range compression method is performed by defining the relationship information (D range compression curve) for associating input brightness values with output brightness values based on a distribution (histogram) of brightness values for each area. More specifically, a wider output brightness value range is associated with a brightness value range having a high appearance frequency than a brightness value range having a low appearance frequency in an area in a brightness value distribution. In other words, a brightness value range that has a low appearance frequency is compressed more strongly than a brightness value range that has a high appearance frequency. This will allow contrast to be maintained in a pixel area of an input brightness value range which has a high appearance frequency. That is, since the contrast of an output image will be more prominent as steeper the slope of an output brightness value change amount is with respect to an input brightness value change amount, contrast degradation due to D range compression can be suppressed.

Figure 1A:
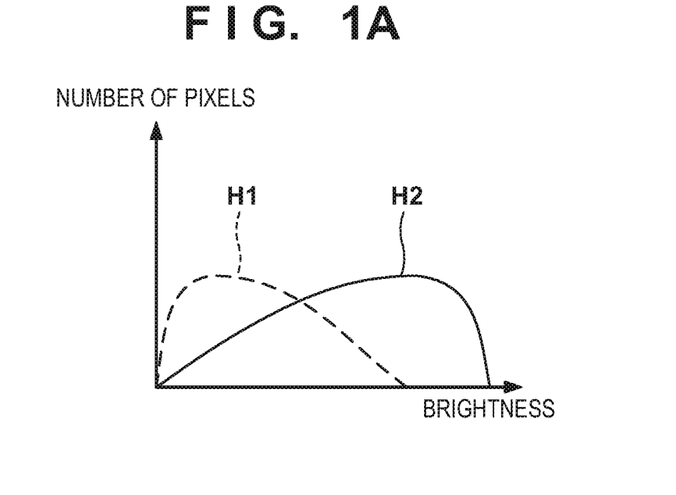
FIG. 1A is a histogram showing a brightness value distribution of an input image.
Figure 1B:
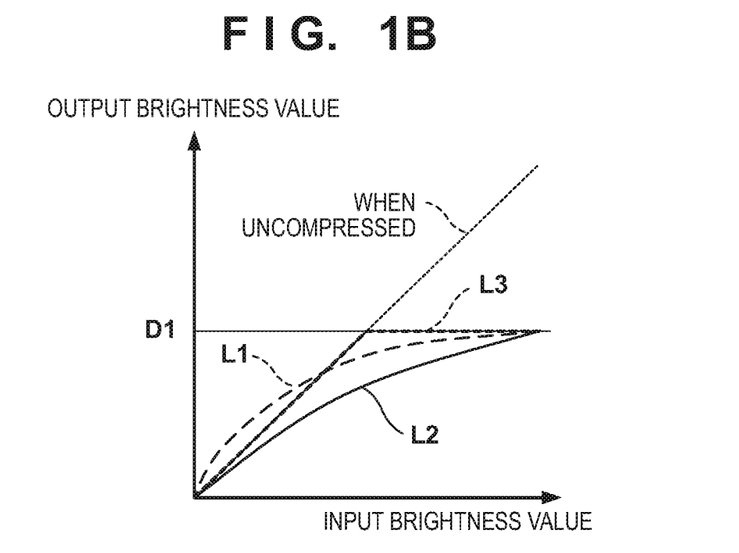
FIG. 1B is a graph showing a D range compression curve based on a histogram of a related art.

A method of generating a D range compression curve in accordance with a brightness value distribution will be described with reference to FIGS. 1A and 1B. FIG. 1A shows an example of a histogram of brightness values of a partial area in an input image, and FIG. 1B shows an example of a D range compression curve generated based on the histogram of FIG. 1A. In this example, as shown in FIG. 1A, assume that an area comprising mainly low brightness value pixels such as a histogram H1 and an area comprising mainly high brightness value pixels such as a histogram H2 are present. Assume that reference symbol D1 denotes a D range that can be expressed by a printing apparatus (printer). In this case, in an area with many low brightness value pixels such as the histogram H1, a D range compression curve in which a wide output brightness value range has been assigned for the low input-brightness value range such as a curve L1 shown in FIG. 1B is generated. On the other hand, a D range compression curve, such as a curve L2 shown in FIG. 1B, assigned with a wide output D range for the high input-brightness value range compared with the curve L1 is generated in an area with many high brightness value pixels such as the histogram H2. The D range can be compressed while maintaining contrast in each area of an output image by generating such D range compression curves. Note that such D range compression may be performed without area division. For example, in a case in which the brightness values of the entire input image tend toward a low brightness range or a high brightness range, the brightness range can be compressed while maintaining the contrast in the output image without performing area division. On the other hand, in the histogram H1, regardless of the fact that frequencies are not distributed or are small enough to be ignored in a range where the brightness value is higher than a predetermined value, a predetermined output brightness value range is assigned to such a high input brightness value range in the D range compression curve (curve L1). If a predetermined output brightness value range is assigned to an input brightness value with a very low appearance frequency in this manner, the width of output brightness value range that can be associated with a low brightness value range having a high appearance frequency will be reduced. As a result, it can degrade the contrast in the low brightness value range that has a high appearance frequency. In addition, although the contrast will not degrade by generating a D range compression curve, such as a curve L3, obtained by clipping a range where the input brightness value is D1 or more if a brightness value frequency distribution such as the histogram H1 is obtained, the gray scale will be eliminated for the range where the input brightness value is D1 or more. In addition, in a case in which output brightness values which are higher than the input brightness values are output to a low input brightness value range such as the curve L1, a viewer may feel that the output image is incongruous because the contrast of the output image will be higher than the actual input image.

This embodiment will describe a method for preventing an output brightness value range from being assigned unnecessarily to an input brightness value range which has a low appearance frequency or does not appear and for generating a D range compression curve that can obtain an output image which gives little sense of incongruity to the viewer. Examples of the procedure of processing will be described after the arrangement examples of a system and apparatuses have been described first hereinafter.

(System Arrangement)

Figure 2:
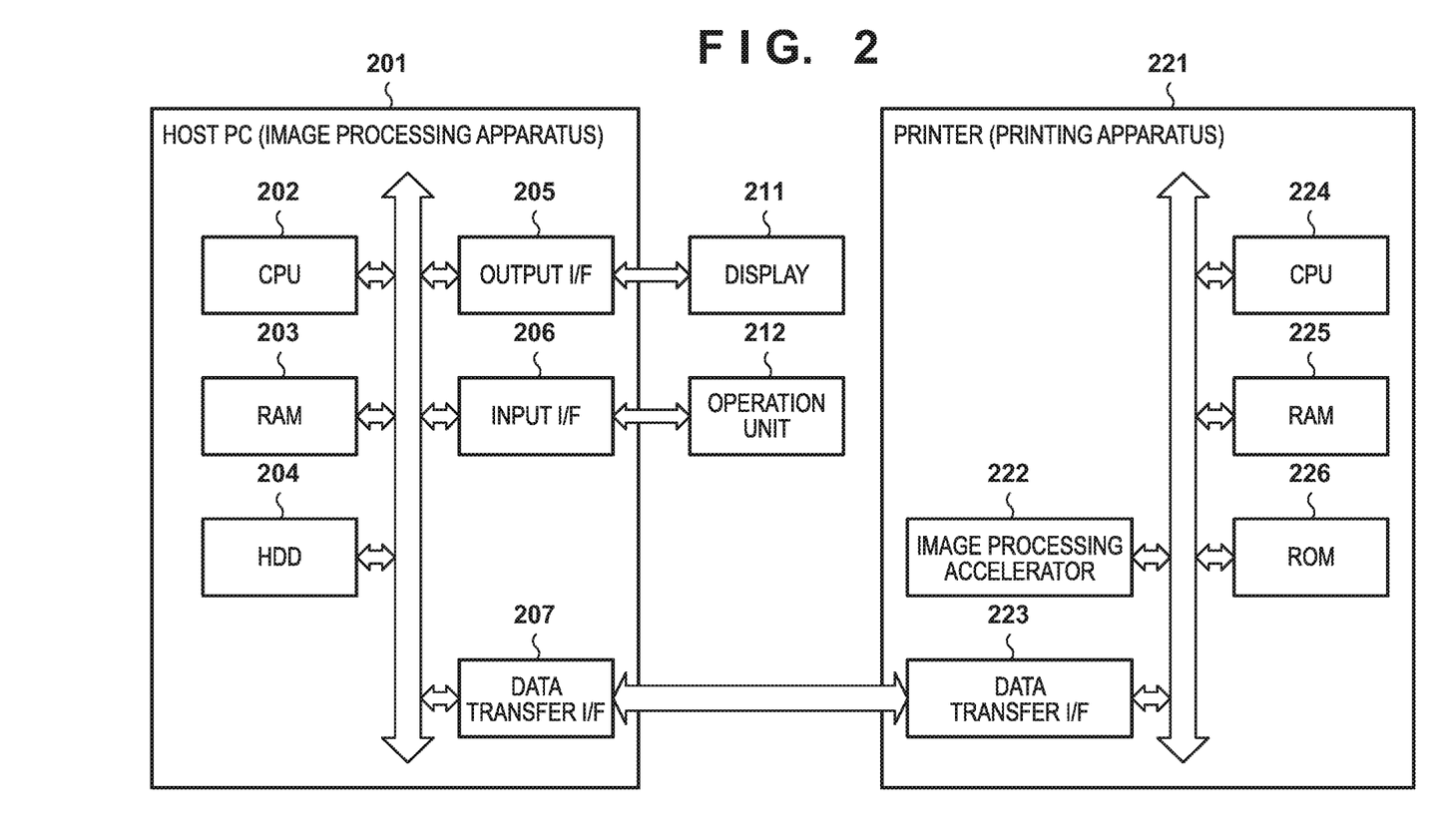
FIG. 2 is a block diagram showing an example of the arrangement of an image processing system.

FIG. 2 shows an example of the arrangement of an image processing system according to this embodiment. This system includes, for example, an image processing apparatus 201 and a printing apparatus 221. Note that this arrangement is merely an example, and an apparatus other than these may be included. Additionally, a plurality of apparatuses shown in FIG. 2 may be integrated into one apparatus by, for example, incorporating the image processing apparatus 201 in the printing apparatus 221. Furthermore, a block included in each apparatus shown in FIG. 2 may include another block. Alternatively, each block of each apparatus may be divided into a plurality of blocks, or one block including a plurality of blocks may be used.

The image processing apparatus 201 is, for example, a host PC (Personal Computer), but may be an electronic device other than this. The image processing apparatus 201 includes a CPU 202, a RAM 203, an HDD 204, an output I/F 205, an input I/F 206, a data transfer I/F 207, and the like. Note that these components are communicably connected to each other via an internal bus or the like. Note that "I/F" is an abbreviation for "interface". In addition, CPU is an acronym for Central Processing Unit, RAM is an acronym for Random Access Memory, and HDD is an acronym for Hard Disk Drive.

The CPU 202 executes various kinds of processing including the overall processing of the image processing apparatus 201 and predetermined image processing using the RAM 203 as a work area in accordance with a program held by the HDD 204. The CPU 202 is an example of a processor, and a processor other than this may be used. For example, another processor such as an MPU (micro processing unit), a GPU (graphics processing unit), or a DSP (digital signal processor) may additionally or alternatively be used. In addition, processing executed by the CPU 202 may partially or wholly be executed by hardware capable of executing the processing such as an ASIC (application specific integrated circuit) or an FPGA (field programmable gate array). The RAM 203 is a memory used to store temporary information. The RAM 203 at least operates to provide a work area when the CPU 202 executes processing, as described above. The HDD 204 is a storage device configured to continuously store information such as a program. Note that a ROM (Read Only Memory) or the like may be used in place of or in addition to the HDD 204. The output I/F 205 is an interface configured to output data held by the image processing apparatus 201 (for example, after predetermined processing is executed) to an information output apparatus such as a display or a speaker on the outside (or an information output apparatus (not shown) provided in the image processing apparatus 201). Note that FIG. 2 shows an example in which the output I/F 205 exchanges data between a display 211 and the image processing apparatus 201. The input I/F 206 is an interface configured to accept information input from devices such as a keyboard, a pointing device, and a touch panel on the outside (or a device (not shown) provided in the image processing apparatus 201), which accept a user operation and output information representing the user operation. An operation unit 212 represents these devices that output information representing the user operation in the example shown in FIG. 2. The data transfer I/F 207 is an interface configured to perform communication with another device, and is, for example, a communication interface including a communication circuit of a wired LAN or wireless LAN. Note that the data transfer I/F 207 may operate in accordance with the USB (Universal Serial Bus) standard or the IEEE (Institute of Electrical and Electronics Engineers) 1394 standard. In FIG. 2, the data transfer I/F 207 is connected to a data transfer I/F 223 of the printing apparatus 221.

For example, the CPU 202 executes processing of generating image data printable by the printing apparatus 221 in accordance with a command input by a user via the input I/F 206 or a program held by the HDD 204. The CPU 202 executes control to transfer the generated image data to the printing apparatus 221 via the data transfer I/F 207. In addition, the CPU 202 can receive image data from an external apparatus such as the printing apparatus 221 or an external apparatus such as an image capturing apparatus (not shown) via the data transfer I/F 207, and perform predetermined processing for the image data in accordance with a program stored in the HDD. The CPU 202 executes control to display an image or various kinds of information obtained as the result of the predetermined processing on the display 211 via, for example, the output I/F 205.

The printing apparatus 221 is, for example, a printer such as an inkjet printer, but may be a printer of another type such as an electrophotographic printer. In place of the printing apparatus 221, another apparatus configured to output an image after the compression of the dynamic range of brightness to, for example, a screen may be used. The printing apparatus 221 includes, for example, an image processing accelerator 222, the data transfer I/F 223, a CPU 224, a RAM 225, and a ROM 226. In the printing apparatus 221, the CPU 224 executes control of the entire printing apparatus 221 or processing of executing various kinds of other processing in accordance with a program stored in the ROM 226 by using the RAM 225 as a work space. Note that the printing apparatus 221 is configured to perform high-speed image processing using the image processing accelerator 222. Note that the image processing accelerator 222 is hardware capable of executing image processing at a speed higher than in the CPU 224. The image processing accelerator 222 is activated when, for example, the CPU 224 writes parameters and data necessary for image processing at a predetermined address of the RAM 225. After loading the parameters and the data, the image processing accelerator 222 executes predetermined image processing for the data. Note that the image processing accelerator 222 is configured to alternatively execute processing executable by the CPU 224. In other words, if the CPU 224 has a sufficient processing capability, the printing apparatus 221 does not need to include the image processing accelerator 222.

(Outline of Processing)

Figure 3:
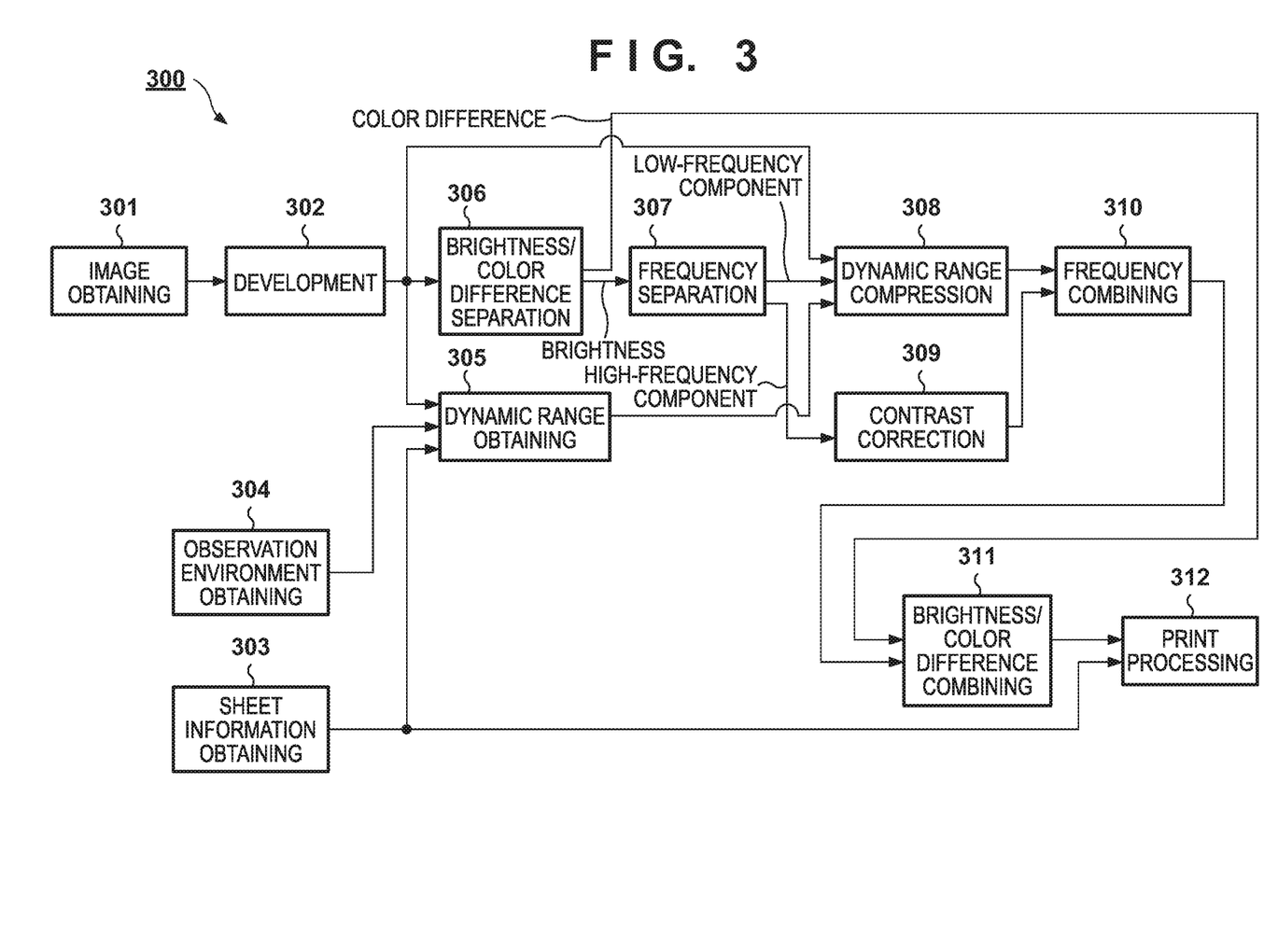
FIG. 3 is a block diagram showing the outline of processing performed until an image is printed.

An example of the procedure of processing 300 until data captured by the image capturing apparatus (not shown) is printed by the printing apparatus 221 will be schematically described next with reference to FIG. 3. Note that although this processing example will describe processing performed for printing an image by the printing apparatus 221, similar processing can be performed, for example, for processing performed to display an image on the display 211. FIG. 3 shows each of a plurality of partial processes included in the processing 300 as a functional block. Note that each functional block may be divided into two or more functional blocks, or a plurality of functional blocks may be integrated into one functional block. In addition, a functional block that is not illustrated in FIG. 3 may be further included. The processing 300 is processing mainly executed by the image processing apparatus 201 and is implemented when, for example, the CPU 202 executes a program saved in the HDD 204 in cooperation with the RAM 203. Note that the processing 300 may be implemented by one application, or may be implemented by a plurality of applications in accordance with the application purpose of the user or the function. Additionally, the image processing apparatus 201 may execute the entire processing 300, or at least a part of the processing 300 may be executed by the printing apparatus 221 or the image capturing apparatus.

In this processing, first, an image obtaining unit 301 obtains an image that the image capturing apparatus has obtained by a sensor. A development unit 302 converts the image obtained by the image obtaining unit 301 into a predetermined format by performing processing to be described later. Calculation of the dynamic range of the brightness of the image data is also performed here, and a value representing the calculated dynamic range is input to a dynamic range obtaining unit 305. The information of a sheet to which printing is to be performed, which is obtained by a sheet information obtaining unit 303, and the information of an environment (observation condition) for observing a printed product, which is obtained by an observation environment obtaining unit 304, are also input to the dynamic range obtaining unit 305 in addition to the value representing the dynamic range. In one example, the dynamic range obtaining unit 305 can specify the range of the dynamic range of the brightness in the output based on the information of the sheet and the information of the observation environment. The dynamic range obtaining unit 305 obtains the dynamic range of the brightness for each of the thus obtained input and output, and outputs the information to a dynamic range compression unit 308.

A brightness/color difference separation unit 306 separates the developed image data into a brightness component (brightness image) and a color difference component (color difference image), inputs the brightness image data after the separation to a frequency separation unit 307, and inputs the color difference image data to a brightness/color difference combining unit 311. The frequency separation unit 307 specifies the spatial frequency of the brightness image, and separates the image into a high-frequency component and a low-frequency component based on the specified spatial frequency. The frequency separation unit 307 outputs the low-frequency component after the separation to the dynamic range compression unit 308, and outputs the high-frequency component to a contrast correction unit 309. The dynamic range compression unit 308 executes processing to compress the dynamic range of the brightness by using the image data from the development unit 302 based on the value within the range of the dynamic range of the brightness obtained by the dynamic range obtaining unit 305. The contrast correction unit 309 executes contrast correction for the input high-frequency component.

After the processing for each frequency component, a frequency combining unit 310 combines the data of the high-frequency component and the data of the low-frequency component, and obtains brightness image data after the processing. The brightness/color difference combining unit 311 combines the brightness image data after the processing and the color difference image data, thereby generating output image data. A print processing unit 312 executes processing for printing the output image data and transmits the processed data to the printing apparatus 221.

The procedure of the processing by the functional arrangement shown in FIG. 3 will be described with reference to FIG. 4. In the processing shown in FIG. 4, first, the image obtaining unit 301 obtains captured image data (step S401). The image data obtained here is not general-purpose data in a JPEG format or the like, which was captured by a digital camera and has undergone predetermined processing, but so-called RAW data as captured. Subsequently, the development unit 302 executes development processing for the image data (step S402). This development processing will be described with reference to FIG. 5.

Figure 5:
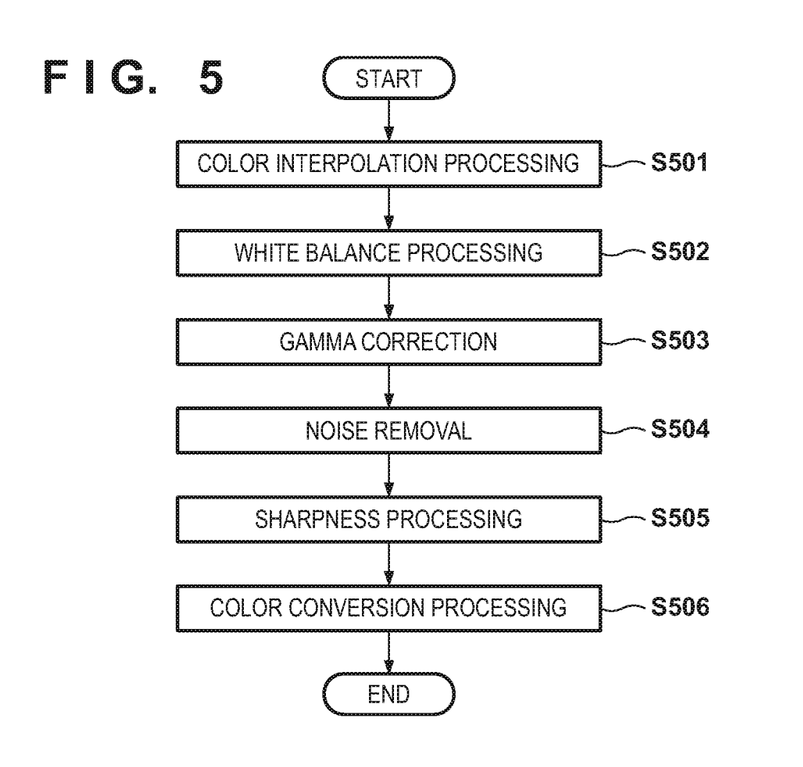
FIG. 5 is a flowchart showing an example of the procedure of development processing.

In the development processing, the development unit 302 first executes color interpolation processing by de-Bayer processing or mosaic processing for each of the pixels in the RAW data formed by single-color signals (step S501). By this processing, the RAW data is converted into R, G, and B image signal values. Subsequently, the development unit 302 executes white balance processing in accordance with preset development settings (step S502). In the white balance processing, R, G, and B signal values are multiplied by set coefficients. Then, the development unit 302 executes gamma correction in consideration of the development settings and the characteristic of a display device (step S503). The development unit 302 executes noise removal and sharpness processing by filter processing as needed based on user settings and image capturing conditions (steps S504 and S505). The development unit 302 then executes color conversion processing (step S506). In the color conversion processing, conversion to a predetermined defined color space, adjustment of the hue, and processing for suppressing color bending in a high brightness area are applied. With the above-described development processing, R, G, and B images each having a desired gamma value are generated.

Referring back to FIG. 4, the dynamic range obtaining unit 305 obtains the brightness data of the bright and dark portions of the input image (step S403). The brightness data of the bright portion is specified based on a value calculated from camera information included in the obtained image data and values calculated from the settings at the time of image capturing and a value extended by the development processing in step S402. The value extension can be executed by, for example, white balance processing in step S502 of FIG. 5. At the time of white balance processing, substitution processing according to the saturation level and pixel information is executed, thereby extending the gray scale of the high brightness area (N stages: N≥1). In addition, the dynamic range obtaining unit 305 obtains the brightness data of the bright and dark portions on the output side (step S404). The dynamic range obtaining unit 305 can store a table of the brightness value for each sheet onto which an image is to be output (printed), and obtain the brightness data of the bright and dark portions on the side of the output image. Note that each brightness value described in the table here has, for example, a value (white serving as a reference≈100 [nit]) obtained under a predetermined general illumination environment. A value converted in consideration of the visual characteristic may be used as this value.

Next, the brightness/color difference separation unit 306 separates each of the R, G, and B signal values into the information of a brightness (Y) and the information of color difference (CbCr) (step S405). Since this separation can be performed by using a general conversion formula, an explanation will be omitted here. The frequency separation unit 307 separates the brightness value image separated in step S405 into a low-frequency component image and a high-frequency component image (step S406). To generate, for example, the low-frequency component image, the frequency separation unit 307 applies a low-pass filter to the input brightness value image. In this processing, for example, a spatial filter may be applied to the brightness value image. Alternatively, the brightness value image may be converted into a spatial frequency image by a FFT, filter processing may be executed for the spatial frequency image, and after that, the image may be returned to the brightness value image by an IFFT. Note that FFT is an abbreviation for fast Fourier transformation, and IFFT is an abbreviation for inverse fast Fourier transformation. A frequency as a passband can be determined based on the sheet size or the observation distance when the printed product is to be appreciated, and in consideration of the characteristics of human vision. On the other hand, to generate the high-frequency component image, the frequency separation unit 307 may, for example, apply a high-pass filter to the brightness value image or subtract the low-frequency component image obtained in the above-described manner from the original image.

The dynamic range compression unit 308 executes dynamic range compression processing for the low-frequency component image obtained in step S406 based on the information of the bright and dark portions of the input and the output obtained in steps S403 and S404 (step S407). Details of this processing will be described later.

The contrast correction unit 309 performs contrast correction processing for the high-frequency component image obtained in step S406 (step S408). The frequency combining unit 310 combines the low-frequency component image that has undergone the dynamic range compression in step S407 and the contrast-corrected high-frequency component image, thereby obtaining brightness value image data that has been compressed to a predetermined dynamic range and also contrast-corrected (step S409). After that, the brightness/color difference combining unit 311 combines the color difference components with the brightness value image data obtained in step S409 (step S410), and converts the values into R, G, and B signals. Since this conversion can also be performed by using a general conversion formula, an explanation will be omitted here. Subsequently, the print processing unit 312 performs image processing for printing for the R, G, and B signal values obtained and outputs them (step S411).

Figure 4:
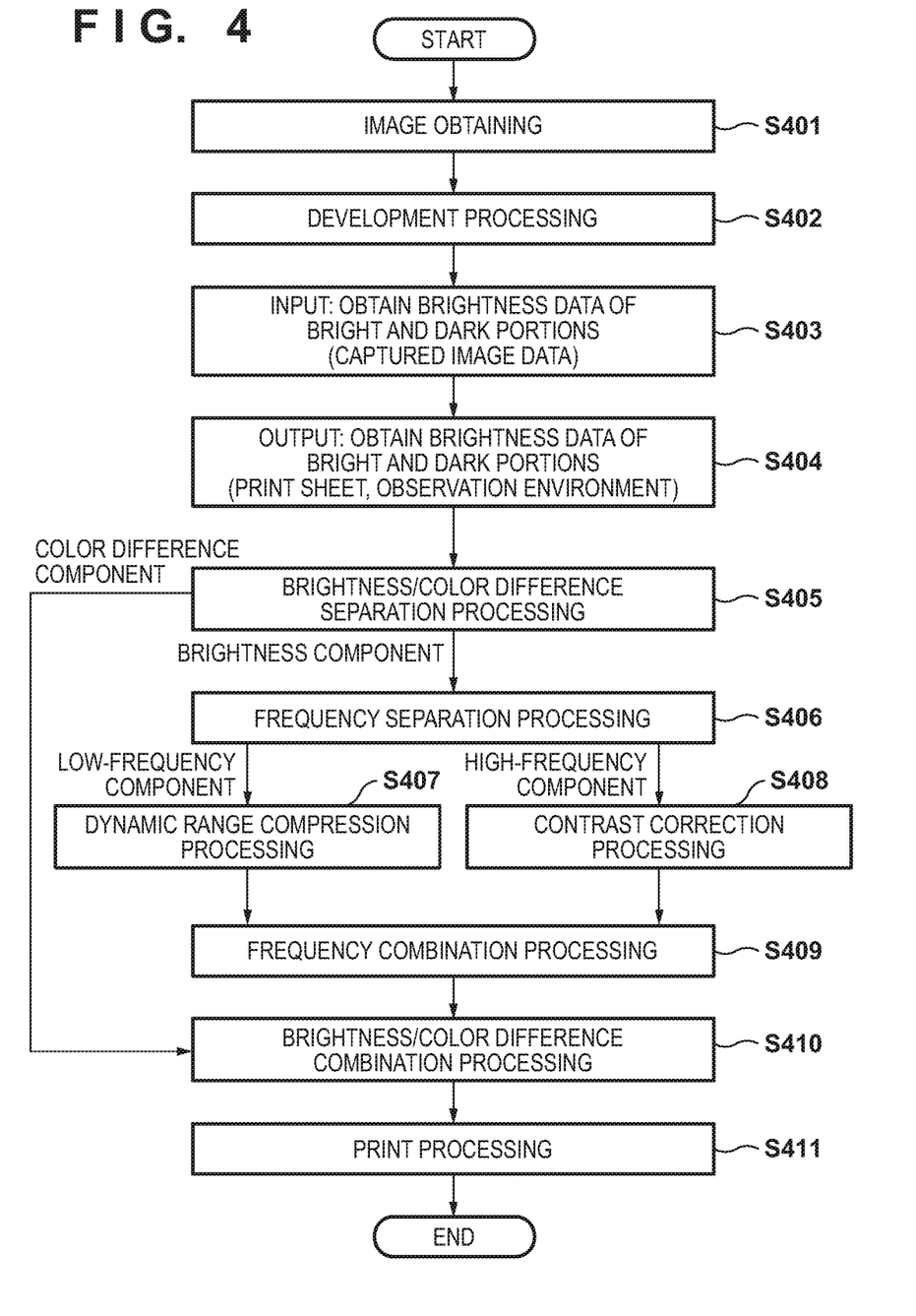
FIG. 4 is a flowchart showing an example of the procedure of processing performed until the image is printed.

By executing processing from the development to the output (printing) of the obtained image by performing processing as shown in FIG. 4, processing that considers the capability (for example, the sheet type) of the output medium and the observation environment can be performed for the dynamic range of the image. Hence, even if image degradation due to dynamic range compression occurs, it is possible to obtain an output product in which the influence of such degradation has been in suppressed by performing this kind of processing.

(Dynamic Range Compression Processing of Brightness)

Figure 6:
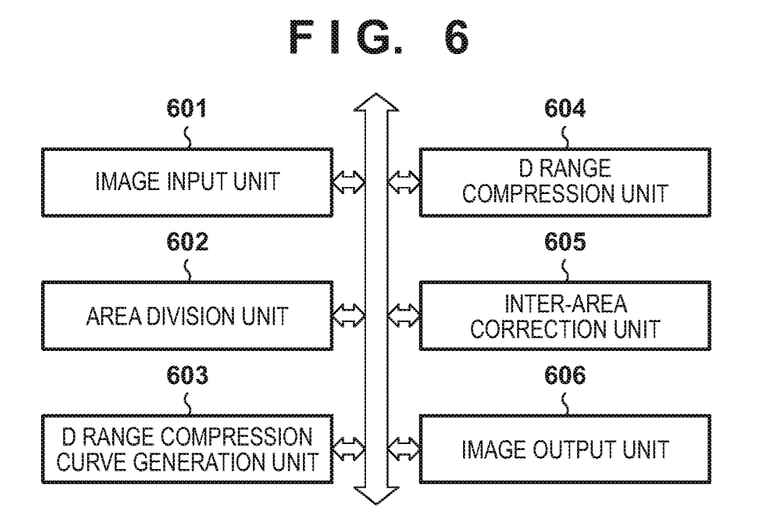
FIG. 6 is a block diagram showing an example of the functional arrangement for dynamic range compression.

An example of the procedure of dynamic range (D range) compression processing) of a brightness executed in the above-described step S407 will be described hereinafter with reference to the block diagram of FIG. 6 and the flowchart of FIG. 7. FIG. 6 shows an example of the arrangement of an image processing function of the image processing apparatus 201. The image processing apparatus 201 accepts HDR (High Dynamic Range) image data as an input, changes the brightness by performing D range compression for the image data, and outputs the image data after the D range compression to the printing apparatus 221 or the display 211.

Figure 7:
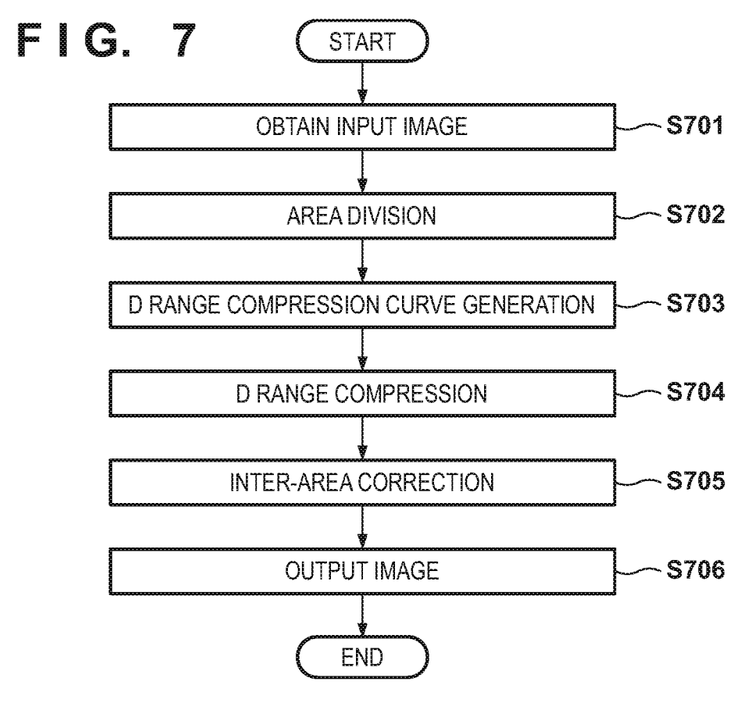
FIG. 7 is a flowchart showing an example of the procedure of dynamic range compression processing.
Figure 8:
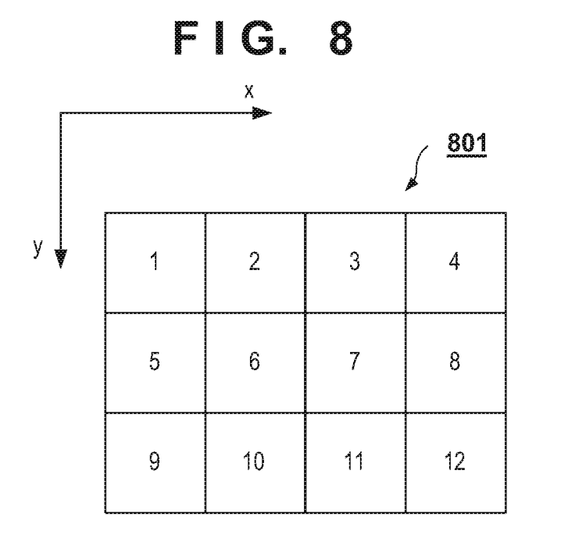
FIG. 8 is a view showing the outline of image area division.

Referring to FIG. 7, first, an image input unit 601 obtains HDR image data (step S701). Note that in this example, the obtained HDR image data is RGB data with a D range of 1,000 nit. As one example, the HDR image data input by the image input unit 601 is represented by an input image 801 shown in FIG. 8. An area division unit 602 divides the input image 801 into a plurality of areas (step S702). In this example, as shown in FIG. 8, the input image 801 is divided into four areas in the x direction and three areas in the y direction, that is, a total of 12 areas. Note that in this example, the divided areas need not have an even size, and at least some areas may have a size different from other areas.

A range compression curve generation unit 603 generates, for each of the areas divided by the area division unit 602, a one-dimensional lookup table (to be referred to as "LUT" hereinafter) for relationship information associating an input brightness value with an output brightness value may be generated as the D range compression curve to perform D range compression (step S703). Note that arbitrary relationship information that associates an input brightness value with an output brightness value may be generated instead of the LUT. A D range compression unit 604 then uses the lookup table generated by the D range compression curve generation unit 603 to compress the D range for each area of the input image (step S704).

Figure 9A:
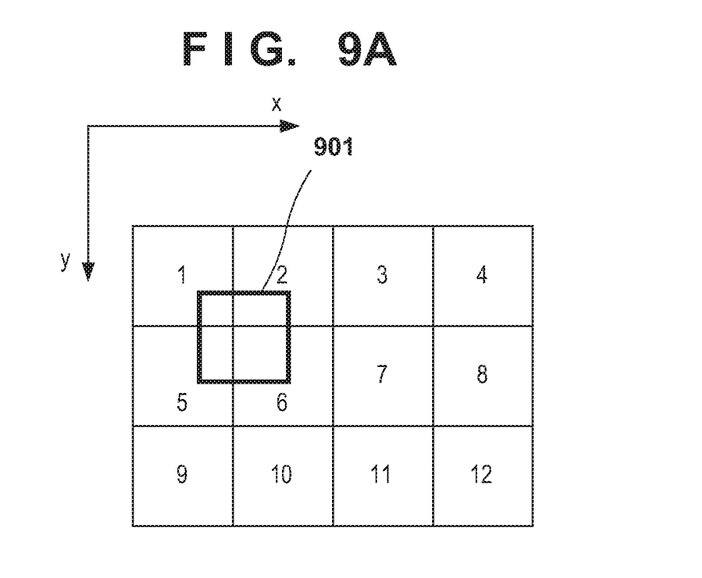
FIGS. 9A and 9B are views for explaining inter-area correction.
Figure 9B:
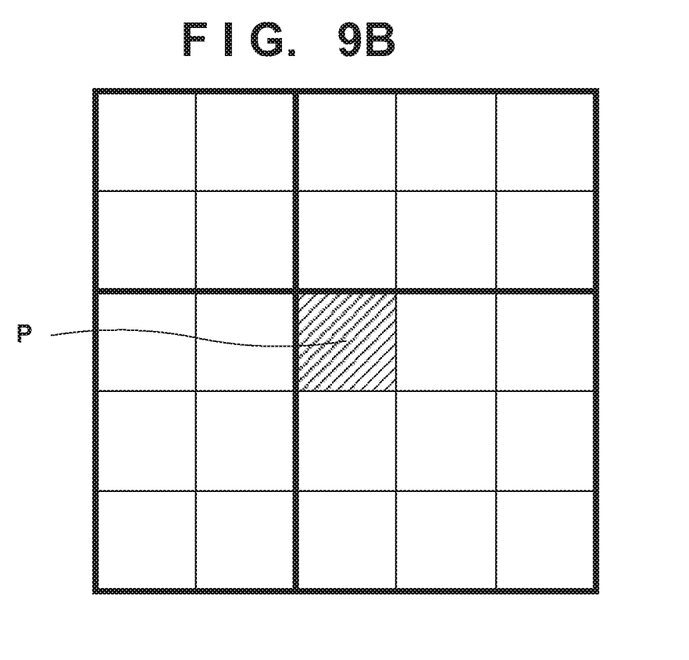

An inter-area correction unit 605 performs inter-area correction on the image that has undergone the D range compression (step S705). Since artifacts such as pseudo contouring and the like can be generated when D range compression is executed by using a separate D range compression curve for each area, this processing is performed as processing to reduce such influences. To reduce such artifacts, the inter-area correction unit 605 extracts a predetermined pixel range including a pixel of interest (for example, at the center) and preforms filter processing by using the pixel values in this extracted range. The filter processing will be described with reference to FIGS. 9A and 9B. Assume here that a window 901 for extracting the above-described predetermined pixel range is arranged at a position shown in FIG. 9A. At this time, as shown in FIG. 9B, the window 901 is used to extract a pixel range of five pixels in the x direction and five pixels in the y direction while setting a pixel P of interest as the correction target at the center. For example, each pixel extracted in the window 901 can be multiplied by a filter coefficient and the resultant pixel values are added to obtain the pixel value of the pixel P of interest to set the value of the pixel P of interest present near the boundaries of an area as a smoothed value obtained by considering the values of adjacent areas. This can reduce the artifacts which are generated at the boundaries of an area. For example, a smoothing filter for setting the same value to every pixel as a filter coefficient, a Gaussian filter in which coefficient values are normally distributed with respect to the pixel P of interest at the center, or the like is used in this filter processing.

Referring back to FIG. 7, an image output unit 606 outputs the image data that has undergone inter-area correction by the inter-area correction unit 605 to the printing apparatus 221 or the display 211 (step S706).

(D Range Compression Curve Generation Processing)

Next, an example of the procedure of D range compression curve generation processing to be executed in step S703 described above will be described in detail.

Processing Example 1

Figure 10:
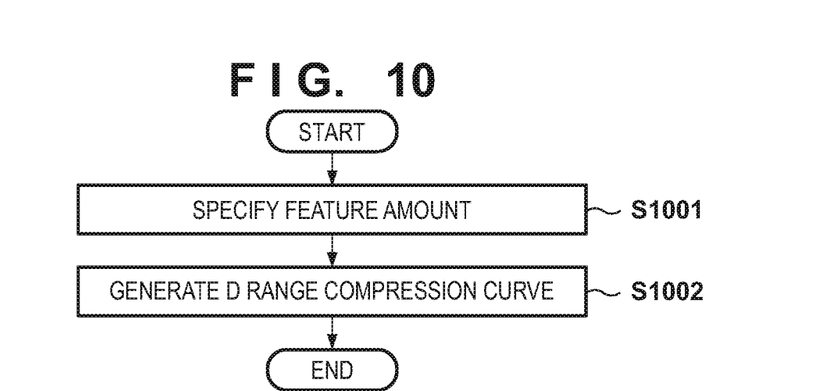
FIG. 10 is a flowchart showing an example of the procedure of D range compression curve generation processing.
Figure 11A:
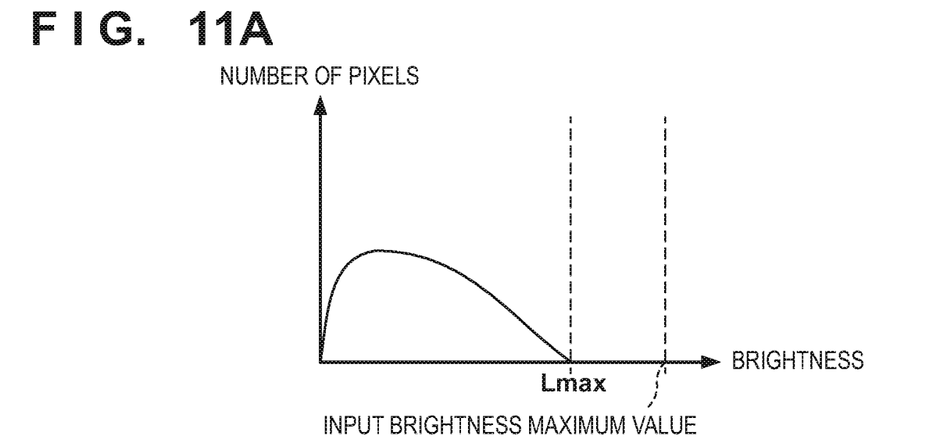
FIG. 11A is a histogram showing a brightness value distribution of an input image.

The first processing example will be described with reference to FIG. 10. Note that the processing of FIG. 10 is performed for each divided area as described above. The D range compression curve generation unit 603 specifies a feature amount from a brightness value histogram of a processing target area (step S1001). In this case, for example, a feature amount can be Lmax which is the maximum value of input brightness values in a processing target area as shown in FIG. 11A. Note that this is merely an example, and another value may be used as the feature amount. For example, since the maximum value of the input brightness values may be data that is actually unnecessary such as noise in an image, a brightness value whose cumulative appearance frequency obtained by cumulatively adding, in descending order from the highest brightness value, the appearance frequencies of brightness values in an area with respect to the number of entire pixels in the area reaches a predetermined ratio (for example, 3%) may be set as the feature amount. Alternatively, a brightness value which is smaller by a predetermined value than the maximum value of input brightness values may be set as the feature amount. The predetermined value in this case may be, for example, a value different for each maximum value of the input brightness values, and this value may be specified, for example, by using a predetermined table or the like. Subsequently, the D range compression curve generation unit 603 generates a D range compression curve (for example, a one-dimensional (1D) LUT) by using the feature amount specified in step S1001 (step S1002).

Figure 11B:
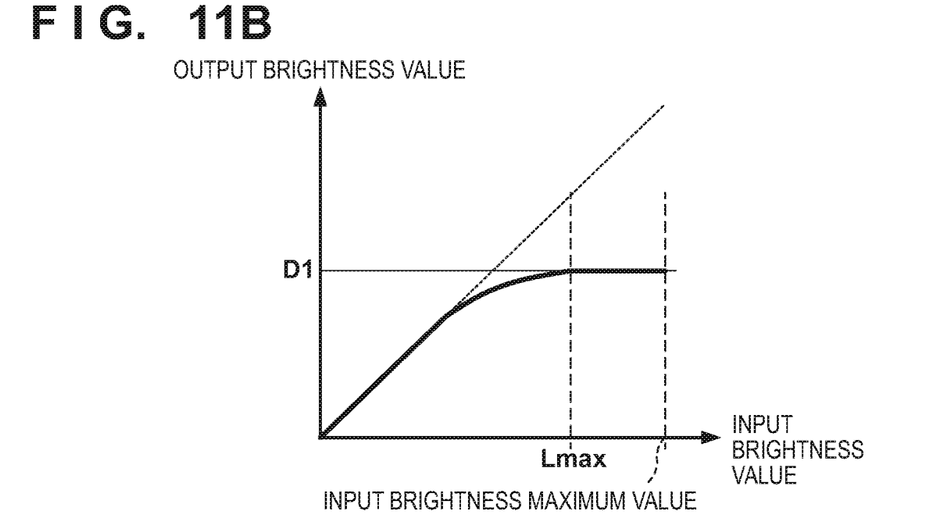
FIG. 11B is a graph showing a D range compression curve generated based on a histogram of an embodiment.

Assume here that Lmax shown in FIG. 11A is specified as the feature amount in step S1001. In this case, as shown in FIG. 11B, the D range compression curve generation unit 603 will generate a D range compression curve (for example, a 1D LUT) so that the output brightness value for Lmax as the input brightness value will be the maximum brightness value D1 that can be expressed by the printing apparatus 221 (or the display 211). Note that for a brightness range for which an input brightness is equal to or less than Lmax, a corresponding output brightness value will be set in accordance with the appearance frequency of an input brightness value. For example, the relationship between each input brightness value and each output brightness value will be defined so that high contrast will be set to an input brightness value range which has a high appearance frequency and low contrast will be set to an input brightness value range which has a low appearance frequency. In addition, the D range compression curve (for example, a 1D LUT) is generated so the output contrast will not be higher than the input contrast. That is, the output brightness range is associated with an input brightness range having a width equal to or more than the output brightness range. If the output contrast is made higher than the input contrast, the contrast will become excessively prominent in the output image due to this influence and a sense of incongruity will be generated for the viewer. Also, when a sufficient output brightness range is not assigned to another brightness range, the contrast can degrade in the other brightness range. However, the output contrast may be set higher than the input contrast in a range that has no influence to the perception of the contrast. For example, JND (Just Noticeable Difference) which is a function of a discrimination range index based on Barten's model may be used. For example, the output contrast may be set higher than the input contrast in a predetermined range which does not exceed one step of a JND index. That is, the output brightness value can be set high within a range which does not exceed a value obtained by adding a predetermined value for brightness difference discrimination to the input brightness values. Note that the predetermined value here may be set regardless of the JND index, and for example, a value that will not give a sense of incongruity to the viewer when the image is viewed may be specified empirically.

In this manner, it is possible to reduce contrast degradation while maintaining the gray scale for each area by specifying a feature amount such as the maximum input brightness or the like in the area and setting a D range compression curve so as to associate the feature amount with the maximum output brightness. In addition, by not increasing the contrast of the D range compression curve excessively, it is possible to reduce the sense of incongruity given to the viewer when he/she observes the output image and reduce contrast degradation in a brightness range to be compressed.

Processing Example 2

Figure 12:
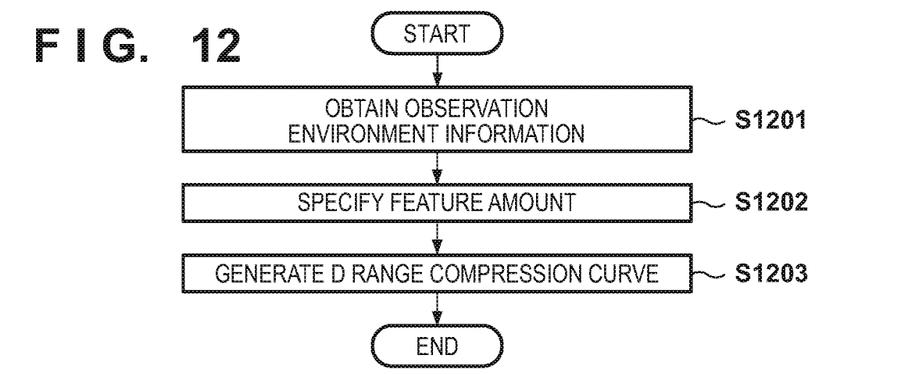
FIG. 12 is a flowchart showing an example of the procedure of the D range compression curve generation processing.

The processing example 2 will be described next with reference to FIG. 12. In this processing example, the D range compression curve generation unit 603 obtains the observation condition when a human being is to observe a printed product output by the printing apparatus 221 (step S1201). The observation condition is, for example, the brightness value of a blank portion when the printed product is to be observed. For example, in a case in which the printed product is to be illuminated at an illuminance of 1,000 [lux] and the reflectance is 90%, the brightness of the blank portion of the printed produced will be calculated as (1,000/π)×(90/100)=287 [nit]. This calculated brightness value is set as a maximum brightness value D2 of an output. Although the brightness is calculated from the illuminance and the reflectance of the printed product in this example, a brightness value measured by a luminance meter may be used. In addition, a user operation for inputting a brightness value related to the observation condition may be accepted via the operation unit 212 or the input I/F 206.

Next, the D range compression curve generation unit 603 specifies a feature amount from the histogram of a target area (step S1202). This process is similar to the process of step S1001 in processing example 1.

Figure 13A:
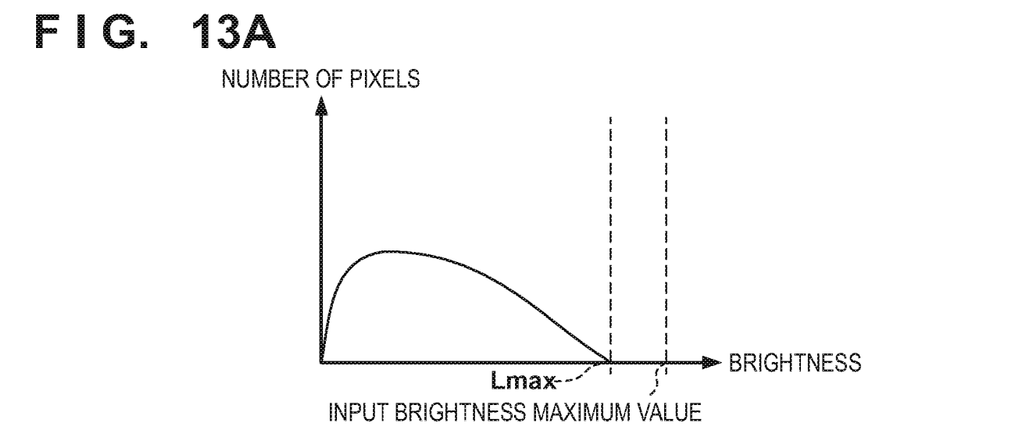
FIG. 13A is the histogram showing the brightness value distribution of the input image.
Figure 13B:
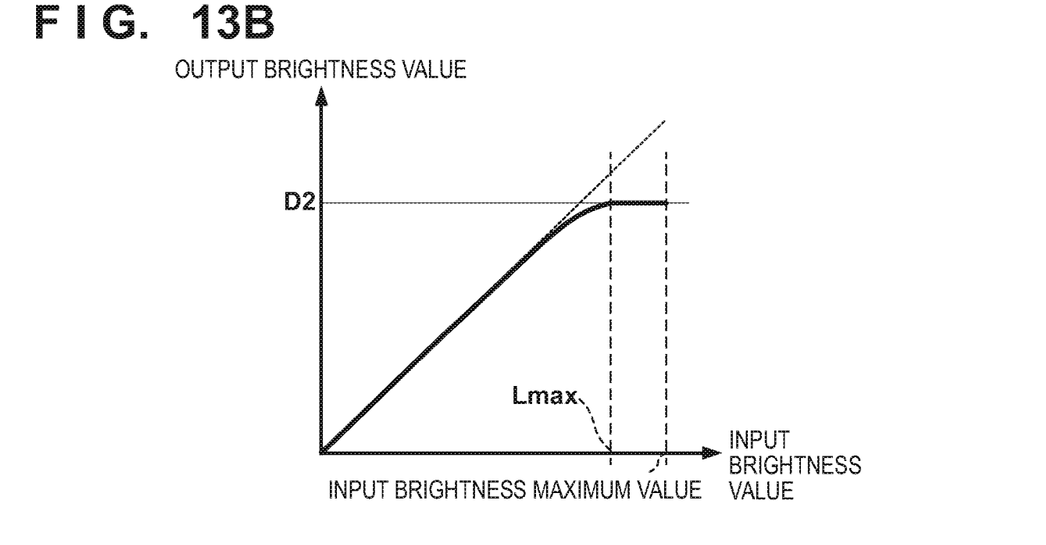
FIG. 13B is a graph showing the D range compression curve generated based on the histogram of the embodiment.

The D range compression curve generation unit 603 uses the feature amount specified in step S1202 to generate a D range compression curve (step S1203). Assume that Lmax, as shown in FIG. 13A, has been specified as a feature amount in step S1202. In this case, as shown in FIG. 13B, the D range compression curve is generated so that the output brightness corresponding to Lmax will be the maximum brightness value D2 obtained in step S1201. For a brightness range for which an input brightness is equal to or less than Lmax, a corresponding output brightness value will be set in accordance with the appearance frequency of an input brightness value. For example, a large output brightness value range, that is, high contrast will be set to an input brightness value range that has a high appearance frequency. Also, a narrow output brightness value range, that is, low contrast will be set to input brightness value range that has a low appearance frequency. Note that the D range compression curve can be generated so the output contrast will not be higher than the input contrast in this processing example as well.

In this manner, it is possible to obtain a contrast matching the brightness of the observation environment by compressing the brightness value of an input image to a brightness range corresponding to the observation environment. In addition, it is possible to reduce contrast degradation while maintaining the gray scale for each area by specifying a feature amount such as the maximum input brightness or the like and setting a D range compression curve that associates the feature amount with the output maximum brightness. Furthermore, by not excessively increasing the contrast of the D range compression curve, it is possible to reduce the sense of incongruity given to the viewer when he/she observes the output image and reduce contrast degradation in a brightness range to be compressed.

Note that although the above embodiment described an example in which a maximum output brightness value is associated with an input brightness value which is equal to or more than a feature amount, the input brightness value may be associated with a predetermined output brightness value which is equal to or more than a sufficiently large predetermined value but smaller than the maximum output brightness value. That is, the D range compression curve is set so that a predetermined output brightness value is associated with the input brightness value which is equal to or more than the feature amount. Note that this predetermined output brightness value can be set to fall within a predetermined range in descending order from the highest value in the range of the output brightness values. Note that the predetermined range in this case may be set beforehand to be a very small number or, for example, a value set beforehand for each width size or a value obtained by multiplying a predetermined ratio to each width size may be specified for the width of the output D range. For example, the predetermined range can be determined to be values belonging to the upper 10% of the D range of the output brightness values. The predetermined output brightness value can be set adaptively so that in a case in which the dispersion of the input brightness values in an area is large, the predetermined output brightness value is set to be a small value in the predetermined range, and in a case in which the dispersion of the input brightness values in an area is small, the predetermined output brightness value will be set to a large value in the predetermined range. In addition, the predetermined output brightness value may be set, for example, for each area. Furthermore, in a case in which the maximum value of the input brightness value is equal to or less than the maximum value of the output brightness value, a curve such as the curve L3 shown in FIG. 1B may be set as the D range compression curve. That is, D range compression need not be performed for such an image (area).

Also, the above embodiment described an example in which a D range compression curve is set so that the area of the range of output brightness values will be equal to or less than the area of the range of input brightness values which are smaller than the feature amount. Particularly, as shown in FIGS. 11A and 11B and FIGS. 13A and 13B, the above embodiment described an example in which a predetermined range with small input brightness values is handled in a manner similar to a case in which the input brightness values and the output brightness values need not be compressed. However, the present invention is not limited to this, and for example, a relationship in which the output brightness values will be directly proportional to the input brightness values at a slope of 1±A, that is, a relationship in which the output brightness values will be larger or smaller than the input brightness values in a predetermined range can be defined.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-129467, filed Jul. 6, 2018 which is hereby incorporated by reference herein in its entirety.

What is claimed is:

1. An image processing apparatus comprising:
at least one processor; and
at least one memory coupled to the at least one processor, wherein the at least one memory stores an instruction that causes, when executed by the at least one processor, the image processing apparatus:
  (a) to obtain a first image;
  (b) to specify a feature brightness value by cumulatively adding appearance frequencies of pixels included in at least one portion of the first image, in descending order of a brightness value from a side of a pixel having a maximum brightness value in the at least one portion of the first image, and obtaining a brightness value as the feature brightness value at which a ratio of the cumulative appearance frequency of pixels with respect to a number of pixels of the at least one portion of the first image reaches a predetermined ratio;
  (c) to generate, for the at least one portion of a first image in which a brightness range is a first range, relationship information that associates an input brightness value that is less than the feature brightness value with an output brightness value and that associates an input brightness value that is not less than the feature brightness value with a predetermined output brightness value that is a value that falls within a predetermined range of a second range of brightness narrower than the first range;
  (d) to output a second image of which brightness values of pixels are output brightness values based on the relationship information and an input brightness value of the first image.

2. The apparatus according to claim 1, wherein the instruction causes the image processing apparatus to obtain information of an observation condition related to the second range when the second image is to be observed.

3. The apparatus according to claim 1, wherein the instruction causes the image processing apparatus to generate the relationship information by setting a maximum brightness value of the second range as the predetermined output brightness value.

4. The apparatus according to claim 1, wherein, for the at least one portion of the first image, the relationship information is generated to associate the input brightness value that is less than the feature brightness value with the output brightness value such that the output brightness value does not exceed a value that is higher than the input brightness value by a predetermined value, and
  wherein the predetermined value is a value determined based on a contrast discrimination range.

5. The apparatus according to claim 1, wherein the instruction causes the image processing apparatus to associate, with the input brightness values of the pixels included in the at least one portion of the first image, output brightness values not exceeding the input brightness values in the generating.

6. The apparatus according to claim 1, wherein the instruction causes the image processing apparatus to divide the first image into a plurality of areas, and
  the relationship information is generated for each of the plurality of areas in the setting.

7. An image processing method comprising:
obtaining a first image;
specifying a feature brightness value by cumulatively adding appearance frequencies of pixels included in at least one portion of the first image, in descending order of a brightness value from a side of a pixel having a maximum brightness value in the at least one portion of the first image, and obtaining a brightness value as the feature brightness value at which a ratio of the cumulative appearance frequency of pixels with respect to a number of pixels of the at least one portion of the first image reaches a predetermined ratio;
generating, for the at least one portion of the first image in which a brightness range is a first range, relationship information that associates an input brightness value that is less than the feature value with an output brightness value and that associates an input brightness value that is not less than the feature brightness value with a predetermined output brightness value that is a value that falls within a predetermined range of a second range of brightness narrower than the first range; and outputting a second image of which brightness values of pixels are output brightness values based on the relationship information and an input brightness value of the first image.

8. The method according to claim 7, further comprising obtaining information of an observation condition related to the second range when the second image is to be observed.

9. The method according to claim 7, wherein,. in the generating, the relationship information is generated by setting a maximum brightness value of the second range as the predetermined output brightness value.

10. The method according to claim 7, wherein, for the at least one portion of the first image, the relationship information is generated to associate the input brightness value that is less than the feature brightness value with the output brightness value such that the output brightness value does not exceed a value that is higher than the input brightness value by a predetermined value, and
wherein the predetermined value is a value determined based on a contrast discrimination range.

11. The method according to claim 7, wherein,. in the generating, output brightness values not exceeding the input brightness values are associated with the input brightness values of the pixels included in the at least one portion of the first image.

12. The method according to claim 7, further comprising dividing the first image into a plurality of areas,
wherein the relationship information is generated for each of the plurality of areas set.

13. A non-transitory computer-readable storage medium that stores an instruction for causing the image processing apparatus:
to obtain a first image;
to specify a feature brightness value by cumulatively adding appearance frequencies of pixels included in at least one portion of the first image, in descending order of a brightness value from a side of a pixel having a maximum brightness value in the at least one portion of the first image, and obtaining a brightness value as the feature brightness value at which a ratio of the cumulative appearance frequency of pixels with respect to a number of pixels of the at least one portion of the first image reaches a predetermined ratio;
to generate, for the at least one portion of the first image in which a brightness range is a first range, relationship information that associates an input brightness value that is less than the feature brightness value with an output brightness value and that associates an input brightness
value that is not less than the feature brightness value with a predetermined output brightness value that is a value that falls within a predetermined range of a second range of brightness narrower than the first range; and
to output a second image of which brightness values of pixels are output brightness values based on the relationship information and input brightness value of the first image.

14. The apparatus according to claim 1, wherein the instruction causes the image processing apparatus:
to separate a low-frequency component of the first image and a high-frequency component of the first image;
to specify the feature brightness value by cumulatively adding appearance frequencies of the pixels included in the at least one portion of the first image, in descending order of a brightness value of the low-frequency component; and
to generate the relationship information for at least one portion of the low-frequency component of the first image.

15. The apparatus according to claim 1, wherein, for the at least one portion of the first image, the relationship information is generated to associate the input brightness values that are not less than the feature brightness value with a constant brightness value as the predetermined output brightness value.

16. The method according to claim 7, further comprising:
separating a low-frequency component of the first image and a high-frequency component of the first image;
specifying the feature brightness value by cumulatively adding appearance frequencies of the pixels included in the at least one portion of the first image, in descending order of a brightness value of the low-frequency component; and
generating the relationship information for at least one portion of the low-frequency component of the first image.

17. The method according to claim 7, wherein, for the at least one portion of the first image, the relationship information is generated to associate the input brightness values that are not less than the feature brightness value with a constant brightness value as the predetermined output brightness value.

18. The computer-readable storage medium according to claim 13, wherein the instruction causes the image processing apparatus to obtain information of an observation condition related to the second range when the second image is to be observed.

19. The computer-readable storage medium according to claim 13, wherein, in the generating, the relationship information is generated by setting a maximum brightness value of the second range as the predetermined output brightness value.

20. The computer-readable storage medium according to claim 13, wherein, for the at least one portion of the first image, the relationship information is generated to associate the input brightness value that is less than the feature brightness value with the output brightness value such that the output brightness value does not exceed a value that is higher than the input brightness value by a predetermined value, and
wherein the predetermined value is a value determined based on a contrast discrimination range.

21. The computer-readable storage medium according to claim 13, wherein, in the generating, output brightness values not exceeding the input brightness values are associated with the input brightness values of the pixels included in the at least one portion of the first image.

22. The computer-readable storage medium according to claim 13, wherein the instruction causes the image processing apparatus to divide the first image into a plurality of areas, and
the relationship information is generated for each of the plurality of areas.

23. The computer-readable storage medium according to claim 13, wherein the instruction causes the image processing apparatus:
to separate a low-frequency component of the first image and a high-frequency component of the first image;
to specify the feature brightness value by cumulatively adding appearance frequencies of the pixels included in the at least one portion of the first image, in descending order of a brightness value of the low-frequency component; and to generate the relationship information for at least one portion of the low-frequency component of the first image.

24. The computer-readable storage medium according to claim 13, wherein, for the at least one portion of the first image, the relationship information is generated to associate the input brightness values that are not less than the feature brightness value with a constant brightness value as the predetermined output brightness value.

25. An image processing method comprising:
(a) setting, for at least one portion of a first image in which a brightness range is a first range, relationship information that associates an input brightness value with an output brightness value;
(b) changing, based on the relationship information, brightness values of pixels included in the at least one portion of the obtained first image; and
(c) outputting a second image which has a second range of brightness narrower than the first range and in which the brightness values of the pixels are changed,
wherein the setting comprises:
(i) specifying a feature amount related to the brightness values included in the at least one portion of the first image, and
(ii) generating the relationship information so as to associate, with each of the brightness values of the pixels included in the at least one portion of the first image, an output brightness value that does not exceed a value that is higher than the brightness value by a predetermined value, and, to associate, with a brightness value that is not less than the feature amount among the brightness values of the pixels included in the at least one portion of the first image, a predetermined output brightness value that is a value that falls within a predetermined range of the second range in descending order,
wherein the feature amount is a brightness value whose ratio of cumulative appearance frequency, which is obtained by cumulatively adding, in descending order, appearance frequencies of the brightness values included in the at least one portion of the first image, with respect to the number of pixels of the at least one portion of the first image reaches a predetermined ratio.

* * * * *